Oct. 28, 1930.  F. W. JARVIS  1,779,707
HOROLOGICAL INSTRUMENT
Filed Nov. 26, 1927
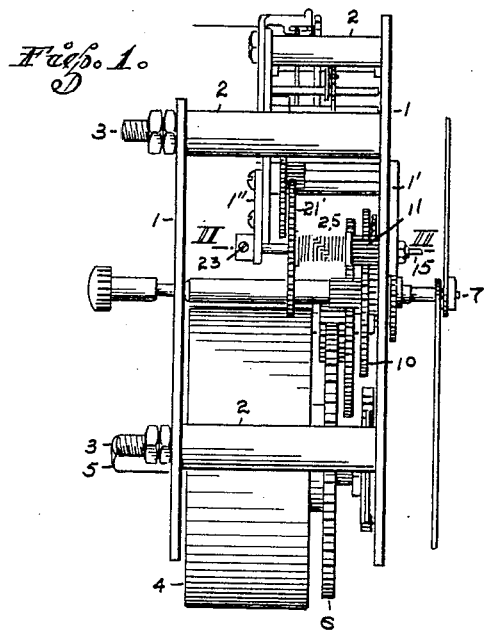
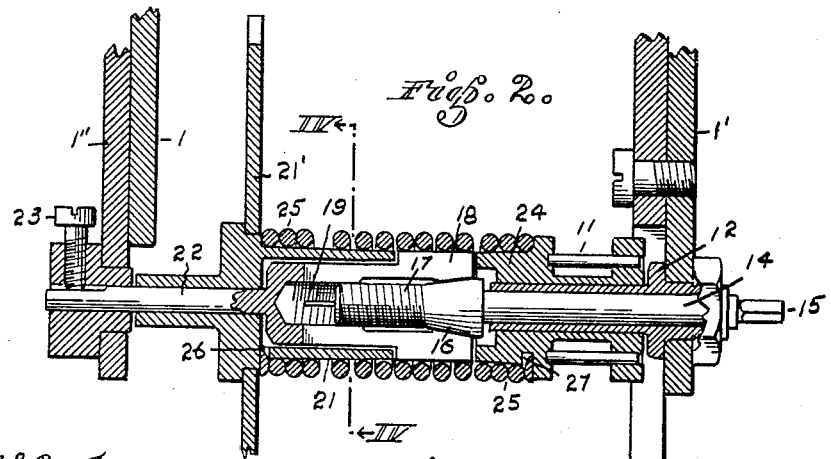
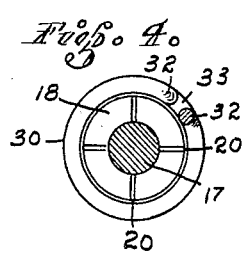
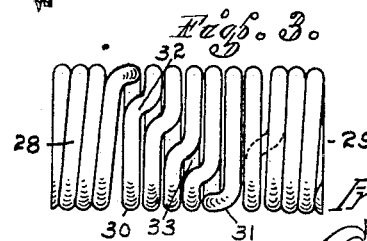
INVENTOR
Franklin W. Jarvis.
BY
Baldwin Vale
ATTORNEY Patented Oct. 28, 1930

1,779,707

UNITED STATES PATENT OFFICE

FRANKLIN W. JARVIS, OF OAKLAND, CALIFORNIA

HOROLOGICAL INSTRUMENT

Application filed November 26, 1927. Serial No. 235,854.

This invention relates to improvements in horological instruments and more particularly to chronometers driven by prime movers for the measurement of time with extreme accuracy during a long period with one winding of the prime mover.

In this connection, reference is made to the patent to Busenbenz, 1,256,872, issued February 19, 1918, for further particulars.
In this art it is the practice in constructing long period clocks, capable of running for four hundred days, more or less, to introduce a spring motor with sufficient stored power to actuate the clock movement for the period desired. Because of the extreme delicacy of and the high gear ratio of the actuating lever escapement on clocks of this type, a secondary torsion spring is introduced between the prime mover and the escapement, with an interposed "snubbing" mechanism for absorbing the tension of the prime mover, to intermittently wind the secondary mover and store enough power therein for short periods to actuate the escapement independent of the prime mover.

Generally speaking such clocks have been in successful operation with the pendulum type of escapement, but have failed in the lever type of escapement for reasons which will hereinafter appear and the correction of which becomes the principal object of this invention. A further object of the invention is the elimination of all end thrust in the application of the torque of the secondary helical spring for driving the escapement. Other objects and advantages will appear as this description progresses.

In this specification the invention is disclosed in the form considered the best, but I do not wish to be understood as confining it to this form, because it may be embodied in other forms, and it is also to be understood that in and by the claims following the description it is desired to cover the invention in whatsoever form it may be embodied.

In the accompanying one sheet of drawings, Fig. 1 is a side elevation of a long time clock movement, modified and constructed in accordance with this invention. Fig. 2 is a longitudinal section through the secondary spring mechanism taken on the line II—II, Fig. 1. Fig. 3 is a detail in side elevation of the secondary spring modified in accordance with this invention. Fig. 4 is a cross-section of the same, taken on the line IV—IV, Fig. 2.

It is a disadvantage of helical springs that they tend to elongate longitudinally when wound up or contracted for the storage of torsional energy. This is especially true when the spring contracts around a fixed clutch member as in the patent cited, in which the coils of the helix engage the surface of the clutch at a pitch oblique to the axis of the clutch.

This disadvantage is entirely obviated by the present invention in which the oblique engagement with the clutch and the oblique frictional contact of the several coils with each other is eliminated by making the coils truly concentric or pependicular to the axis of the arbor around which they may be coiled, as will now be explained explicitly.

In detail, the construction illustrated in the drawings comprises the side plates 1—1 of the clock frame, held in spaced relation by the interposed sleeves 2—2 surrounding the connecting bolts 3—3, in the conventional manner. The prime mover, in the form of a coiled spring is enclosed within the casing 4, and has its inner end fixed to the transverse arbor 5, and its outer end fixed to the casing 4, that is caused to revolve by the unwinding of this spring to which a tension is applied by means of a key or crank on the squared end of the arbor 5. A conventional ratchet and pall is interposed between the arbor 5 and the casing 4 for maintaining the tension during the act of winding. The driving gear 6 is fixed to the casing 4 and enmeshes with a pinion to drive a train of gears interposed between the prime mover and the arbor 7 upon which the minute and hour hands 8 and 9 are mounted in the conventional manner. Continuing past this arbor, the gear 10 enmeshes with the lantern type pinion 11 of the secondary spring mechanism.

This pinion 11 is revolvable on the stud 12 fixed to the plate 1' forming part of the frame 1. The stud 12 is hollow and the stem 14 is rotatable therein and has the protruding end

15 that is squared to receive a key for rotating it. The inner end of this stem is provided with the conical head 16 and the threaded end 17. The cylindrical clutch member 18 has a concentric outer surface or head and is internally tapered to engage the taper 16. The clutch is internally threaded as at 19 to engage the thread 17 on the expanding member. This clutch is slotted on its horizontal and vertical diameters for a considerable portion of its length at 20—20, see Figs. 2 and 4, to permit the segmental head 18 to expand when the threaded end 17 is screwed thereinto, by rotating the stem 14. This clutch has a reduced diameter to extend within the tubular hub 21 of the gear 21' which in turn is rotatably mounted upon the stem 22 of the clutch which extends through the side plate 1" of the frame and is fixed against rotation by the set screw 23 threaded into a boss fixed to the frame 1 and setting against a flattened portion of the stem 22. The hub 21 is slightly tapered away from the gear 21' throughout its length. There is a similarly tapered hub 24 on the end of the lantern pinion 11. This pinion 11 and the gear 21' are adapted to move in synchronism through the engagement of the opposite ends respectively of the secondary spring 25. The opposite ends of the spring 25, for about 3 or 4 coils are helical and such coils may lie in contact with each other without interfering with the spaced intervening concentric coils of the spring. For a more definite engagement of the opposite ends of the spring with these respective hubs 21 and 24 each is provided with a transverse socket as at 26 and 27 into which the respective bent ends of the spring are engaged to prevent slipping. The ends being anchored into the two hubs prevents any possible slip of the spring on either hub and the consequent throwing out of time of the central arbor 7, with the hands thereon, allowing the hands to move faster than the escapement.

Until the invention of the interposed governor by Busenbenz, long period clocks were impractical, because the escapement could not withstand the pressure of the stored tension in the prime mover and could not be made strong enough except at the expense of accucuracy. Neither have such clocks proved successful with the lever type of escapement because of the longitudinal lengthening, crowding and creeping of the helical spring, as previously set forth, when it engages the clutch. This disadvantage is entirely eliminated by the modification of the secondary spring forming the subject of this invention and best illustrated in Fig. 3.

The coils at the opposite ends of the spring, as at 28 and 29 are normal helices and the ends of the spring are squared off in the usual manner and the ends of the wire bent inward to engage the recesses as at 26 and 27 to make a positive anchorage in addition to the frictional grip of the terminal coils in their engagement with the hubs 21 and 24. The intermediate coils of the spring from 30 to 31 are provided with offsets as at 32 to eliminate the spiral of the coils and form true concentric bands the planes of which are perpendicular to the axis of the coil spring 25, whereby the engagement of these coils with the clutch head 18 is a true circumferential wrap and acts as a band brake without tendency to creep, slip or thrust laterally. The gaps 33 between the offsets 32 in the various coils enable these coils to contract and expand without longitudinal thrust in storing up and releasing torque. As a further precaution it is advisable to separate these coils slightly one from the other from .003 to .005 of an inch. The offsets 32 bridging across from coil to coil also bridge the gaps between the ends of the clutch head 18 and the adjacent hub ends 21—24. The coils are thus prevented from dropping into these separations, and from riding up onto the end edges of the clutch head 18, when the coils contract. Many of the salient points of this invention are microscopically significant in the mode of operation and the minute intervals of time involved and should be taken into consideration in the interpretation and practice of this invention.

This invention operates substantially as follows: The thrust of the prime mover in the casing 4 through the interposed gear train to the pinion 11, causes the rotation of the latter to wind up the secondary spring 25 against the resistance of the gear 21' driving the escapement, until the necessary degree of tension is accumulated within the spring 25 to drive the escapement. At this time the coils encircling the segmental head 18 fixed to the frame 1, contract thereabout and prevent a further expenditure of thrust by the prime mover, in effect acting as a "snubber" against the prime moving spring, arresting its further unwinding movement. During this snubbed or delayed movement the tension in the secondary spring 25 has uncoiled to drive the escapement. This intermittent driving action of the escapement may occur as often as two hundred times per minute.

The minimum amount of torque necessary to drive the escapement intermittently, independent of the prime mover, can be determined to a nicety by turning the protruding squared end 15 of the stem 14 and screwing it into the threaded bore of the clutch causing the tapered head 16 to expand the clutch head 18 to the desired extent to be gripped by the contraction of the secondary spring 25 as previously described. This adjustment once determined need not again be altered during the life of the clock, ordinary wear and tear excepted. This adjustment is determined by making a partial turn of the squared end 5 of the spring arbor of the prime mover, at the same time expanding the clutch 18 as described until just enough energy is transmitted to the secondary spring to drive the escapement with the exact thrust required for its efficient operation. Once determined by the adjustment of the clutch, no greater amount of energy can be stored within the secondary spring 25. Consequently the escapement is forever guarded against undue strain and will operate with the maximum of accuracy; thus eliminating the high degree of precision heretofore necessary in the construction of chronometers and other high grade horological instruments whose accuracy in operation have depended upon excellence of workmanship and the elimination of friction.

Applicant has developed the present invention as a motive means for horological determinations in maritime and aerial navigation, wherein extreme accuracy is requisite and only the lever type of escapement is practical, in a chronometer having the necessary power to drive other mechanisms connected therewith, which will be made the subject of separate applications.

Such snubbing control of a secondary drive, such as the spring 25, may be interposed between any form of prime mover, such as induction watt meters and the like and their recording mechanisms, where extreme accuracy is desired.

Having thus described this invention what I claim and desire to secure by Letters Patent is:

1. A clock movement having a prime mover, an escapement and a clutch member mounted in a frame, a secondary spring between said prime mover and escapement and encircling said clutch member and adapted to contract and engage said clutch member, the engaging coils of said spring being perpendicular to the axis of said clutch member.

2. A clock movement having a prime mover, an escapement and a clutch member mounted in a frame, a secondary spring between said prime mover and escapement and encircling said clutch member and adapted to contract and engage said clutch member, the opposite ends of said spring being anchored in the adjacent gears in said movement, the clutch engaging coils of said spring being offset with regard to each other to form encircling bands the planes of which are perpendicular to the axis of said arbor.

3. A clock movement having a prime mover, an escapement and a clutch member interposed in an arbor of said movement, mounted in a frame, a pinion and a gear each having anchor means thereon and independently rotatable on said arbor and having continuously tapered hubs coaxial with said clutch member; a secondary spring encircling said hubs and clutch member and having its opposite ends anchored to said anchor means, said spring adapted to drive said gear in synchronism with said pinion during expansion and to contract and engage said clutch member and snub said prime mover, the planes of the coils of said spring engaging said clutch member being perpendicular to the axis of said arbor.

In testimony whereof I have hereunto affixed my signature.

FRANKLIN W. JARVIS.